United States Patent
Olajos et al.

(10) Patent No.: US 11,082,624 B2
(45) Date of Patent: Aug. 3, 2021

(54) VIDEO CAMERA SYSTEM AND WITH A LIGHT SENSOR AND A METHOD FOR OPERATING SAID VIDEO CAMERA

(71) Applicant: Axis AB, Lund (SE)

(72) Inventors: Rikard Olajos, Lund (SE); Ola Håkansson, Lund (SE); Axel Thuresson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/096,980

(22) Filed: Nov. 13, 2020

(65) Prior Publication Data

US 2021/0195084 A1    Jun. 24, 2021

(30) Foreign Application Priority Data

Dec. 19, 2019 (EP) ..................... 19217798

(51) Int. Cl.
*H04N 5/235* (2006.01)
*H04N 5/33* (2006.01)
*H04N 5/232* (2006.01)

(52) U.S. Cl.
CPC ....... *H04N 5/2352* (2013.01); *H04N 5/23299* (2018.08); *H04N 5/332* (2013.01)

(58) Field of Classification Search
CPC .. H04N 5/2352; H04N 5/23299; H04N 5/332; H04N 5/33; H04N 5/23245;
(Continued)

(56) References Cited

U.S. PATENT DOCUMENTS 8,014,664 B2 * 9/2011 Ismael .................. G03B 11/00
                                                            396/241
10,531,058 B2 * 1/2020 Hjelmstrom ........... H04N 5/238
(Continued)

FOREIGN PATENT DOCUMENTS

| EP | 2757769 A1 | 7/2014 |
| EP | 3079350 A1 | 10/2016 |
| JP | 2007-49442 A | 2/2007 |

OTHER PUBLICATIONS

Extended European Search Report received for EP Application No. 19217798.8, dated Aug. 10, 2020, 11 pages.

*Primary Examiner* — Pritham D Prabhakher
(74) *Attorney, Agent, or Firm* — Xsensus LLP

(57) ABSTRACT

A video camera system comprises an imaging system having a camera lens and an image sensor, and a retractable IR-cut filter, and a control unit for controlling the imaging system. The video camera system has a day-mode in which the IR-cut filter is arranged in front of the image sensor, and a night-mode in which the IR-cut filter is retracted from its position in front of the image sensor. Furthermore, the video camera has a field of view defined by properties of its imaging system, and it comprises a separate light-sensor for measuring an ambient light level so as to support a decision regarding when to actuate a transfer from night-mode to day-mode, or vice versa. The camera system is characterized in that the separate light sensor has imaging optics and is enabled for a variable field of view, which is aligned with a field of view of the video camera system, and in that a current field of view of the video camera system is used when selecting an active field of view of the separate light sensor.

15 Claims, 3 Drawing Sheets

(58) Field of Classification Search
CPC .. H04N 5/235; H04N 5/232945; H04N 5/238; H04N 7/18; F21V 5/007
USPC .................................................. 348/207.99
See application file for complete search history.

(56) References Cited

U.S. PATENT DOCUMENTS

| | | | |
|---|---|---|---|
| 10,560,670 B2* | 2/2020 | Sato | H04N 9/04553 |
| 10,609,298 B2* | 3/2020 | Duran | H04N 5/2351 |
| 10,609,300 B2* | 3/2020 | Feng | H04N 5/2351 |
| 2006/0244583 A1 | 11/2006 | Kawada | |
| 2010/0098401 A1* | 4/2010 | Ismael | G03B 17/12 |
| | | | 396/241 |
| 2015/0211708 A1 | 7/2015 | Stavely et al. | |
| 2016/0127659 A1 | 5/2016 | Kawasaki | |
| 2018/0152606 A1* | 5/2018 | Edpalm | H04N 19/107 |
| 2018/0329511 A1* | 11/2018 | Aman | A63H 30/04 |
| 2019/0007665 A1* | 1/2019 | Hjelmstrom | H04N 5/2356 |
| 2019/0068929 A1* | 2/2019 | Sato | H04N 9/04553 |
| 2019/0104247 A1* | 4/2019 | Feng | H04N 5/2351 |
| 2019/0246025 A1* | 8/2019 | Duran | H04N 5/3572 |
| 2021/0027482 A1* | 1/2021 | Naik | H04N 7/18 |
| 2021/0152791 A1* | 5/2021 | Bikumandla | H04N 13/246 |

\* cited by examiner

VIDEO CAMERA SYSTEM AND WITH A LIGHT SENSOR AND A METHOD FOR OPERATING SAID VIDEO CAMERA

CROSS REFERENCE TO RELATED APPLICATIONS

The present application is based on and claims priority of European Patent Application No. 19217798.8 filed on Dec. 19, 2019, the entire contents of which are incorporated herein by reference.

TECHNICAL FIELD

The present invention broadly relates to controlling IR filters for cameras, and in particular to a switch sensor utilized to determine when to switch from night-mode to day-mode in a video camera provided with a retractable IR-filter.

TECHNICAL BACKGROUND

The use of IR (infra-red) filters for cameras is well known in the art, and in particular in relation to digital cameras. In short, the image sensor of the camera has a spectral response with a non-negligible component in the infrared. This results in opportunities as well as challenges. An opportunity lies in that in low-light conditions the IR-component may provide useful information about the imaged scene, information which may be enhanced even further by means of an IR light source. Since many image sensors has a response in the IR-portion of the spectrum, there is a challenge in that the IR-component will distort the color balance in the image, and it may also saturate the image sensor completely.

A way of maintaining the beneficial effects while suppressing the less beneficial effects is to add a movable IR-cut filter in the beam path in front of the image sensor. In this way, the IR (cut) filter may be used during daylight conditions, enabling acquisition of color images. Throughout the application "IR-cut filter" and "IR-filter" may be used interchangeably, and unless explicitly stated "IR-filter" will in the present context correspond to an IR-cut filter. Pixels of the image sensor will then operate in a first manner, where the incident light is divided into colors and detected as a charge on individual photodetectors thus enabling color separation. During night time, or in low-light conditions the IR filter may be retracted, and use is made of the resulting increase in incoming radiation from the IR portion of the spectrum. The IR radiation will not contain any color information, and instead of performing a color separation, the only parameter is the intensity of the incoming radiation, which may be presented as a black and white intensity image (or with any desirable color scale). The addition of an IR light source may enhance the image even further.

A separate light sensor with an IR-cut filter may be used for controlling when to insert and when to remove the IR-filter, such that when the level of ambient light becomes too low, the camera switches to night mode by removing the IR filter of the camera and optionally using an IR light source, either carried by or incorporated in the camera, or arranged externally thereof.

In the straightforward solution an IR-cut filter is arranged in front of the image sensor, and an actuator is used for moving the filter between a position in which it completely covers the image sensor ('day-mode') and a position in which it is completely removed from obscuring the image sensor ('night mode'). This on-or-off approach is believed to be the most common approach in commercially available products, though the approach does have some accompanying artifacts. A switch to night-mode is straightforward in the sense that when the ambient light level is too low for color imaging a switch to night-mode is performed, and removal of the IR-filter will increase the amount of radiation reaching the image sensor. After switching from night-mode to day-mode, i.e. after having inserted the IR-filter in front of the image sensor, however, it is not uncommon that the light level with the IR-filter in the beam path becomes too low, and that a switch back to night-mode is necessary, resulting in a back-and-forth flickering between night-mode and day-mode. Apart from being very annoying for an operator observing a resulting video stream, it results in considerable wear on the actuator. The cause of the problem is that the IR-contribution of the detected intensity is not readily possible to quantify until the IR-filter has been added—fully or partly, at least not by using the image sensor only. As mentioned above the current solution is to add a light sensor having an IR-filter, so that it may be deduced that the light level (in the visible spectrum) is acceptable prior to effecting the switch. There may still, however, be a flickering effect for reasons to be addressed by the present invention.

The present invention mainly relates to improvements in IR-filter control.

SUMMARY

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

To this end, and to eliminate or at least alleviates problems of prior art, the present invention relates to a monitoring camera system. The system comprises an imaging system having a camera lens and an image sensor, and a retractable IR-cut filter, and a control unit for controlling the imaging system. The video camera system has a day-mode in which the IR-cut filter is arranged in front of the image sensor, and a night-mode in which the IR-cut filter is retracted from its position in front of the image sensor, and a field of view defined by properties of its imaging system. Furthermore, the camera system has a separate light-sensor for measuring an ambient light level so as to support a decision regarding when to actuate a transfer from night-mode to day-mode, or vice versa. The separate light sensor has imaging optics and is configured to provide a variable field of view, which is aligned with a field of view of the video camera system, and a current field of view of the video camera system is used when selecting an active field of view of the separate light sensor.

Since the separate light sensor is enabled for a variable field of view, it may be ensured that a current field of view of the camera system is taken into account when evaluating an ambient light level. The variable field of view mainly relates to the ability of the separate light sensor to adapt to variations in zoom level of the video camera. A field of view may of course also change as result of a change in orientation of the video camera, yet since the separate light sensor in most embodiments would be fixedly arranged in relation to the video camera (and therefore has a constant orientation relative to the video camera), this does not add any problem. As a consequence of the variable field of view, the present invention enables measuring of the local ambient light level in an imaged scene, so that such local variations may be taken into account when controlling an IR-cut filter. More specifically, the ambient light level in the scene currently being imaged by the video camera system, i.e. the current field of view, may be used when making the decision, while the ambient light level in areas outside of the scene may be disregarded when selecting the active field of view of the light sensor. It is considered that other elements of the claim should be well known as such, e.g., the retractable IR-cut filter may be of any type considered suitable for the application. Furthermore, the physical action of retracting/inserting of the retractable IR-cut filter may be effected using any actuation mechanism. The most commonly used are presently to translate it into position, or to rotate it into position, both well known to the skilled person. Furthermore, when the IR-cut filter is retracted a dummy glass may take its place to maintain the same beam path. This is also well known. In the day-mode a Bayer filter enables for an image processing system to combine different color components and to compose a color image, while in night-mode it is common to present the image as a grayscale image, only showing intensity (due to the effect of the IR-contribution).

In one or more embodiments the separate light sensor may be provided with a multi-pixel sensor element for facilitating the variable field of view. This embodiment, or rather this group of embodiments, is described in greater detail in the detailed description of embodiments, yet one immediate advantage is that the selection of an active field of view may be readily performed without any additional mechanical actuators or variable optics (e.g. zoom lenses, etc.) following that the separate light sensor has been aligned with or calibrated to the video camera. The multipixel sensor element may be of any commonly used type, and the features would be similar to that of a regular image sensor in that it would offer a spatial resolution, e.g. it comprises light sensitive pixels distributed over a surface (typically arranged in rows and columns).

In the same or other embodiments, the separate light sensor comprises a sensor element and a variable size aperture in an image plane of the light sensor providing a variable field of view. In the context of the present application the word "image plane" is meant to mean a position in the beam path where a real image of an imaged scene is formed, which we believe is the established meaning. For this embodiment the sensor element does not have to be of a multipixel type, since the selection of the variable field of view is provided by the variable size aperture. This may be simply accomplished by controlling the size of the aperture by the field of view of the camera system. The smaller the field of view (the greater the zoom level), the smaller the aperture, and since the aperture is arranged in the image plane, the field of view of the camera system may be readily correlated. Some alternatives for the aperture and its control are disclosed in the detailed description, most of which provide a continuous variation of size and analogue control.

In another embodiment, the separate light sensor may comprise at least two imaging lenses of different focal length, preferably arranged in parallel, and one sensor element for each imaging lens, enabling provision of the variable field of view by means of a weighted combination of a signal from each sensor element. In this embodiment one sensor element may evaluate ambient light from a maximum field of view of the camera system, and another may evaluate ambient light from a minimum field of view of the camera. These evaluations may be used in order to combine (e.g. interpolate, extrapolate, or merely provide a mean value based on another type of weighted combination) the readings in order to provide a value for the current field of view of the camera system. In a situation where the actual field of view is close to the one represented by one of the light sensor elements, a measure may be based on that particular light sensor alone, e.g. such that the weight becomes one and zero, respectively, in a situation where there are two sensor elements. Compared to previous and following embodiments this embodiment represents a tool that may provide a less precise result, at least for some intervals in a range of fields of view. Nevertheless, the use of fixed systems which may be realized using simple and straightforward components, may be a sufficient advantage for this embodiment to be used. Additional light sensors may increase the preciseness, at the cost of increased complexity and size.

In one or several embodiments the imaging lens of the light sensor is a zoom lens, providing light from a variable field of view to fall onto the image sensor element. In such embodiment the sensor element of the light sensor may or may not be of a multipixel type, but importantly it would not have to be in order to enable a variable field of view.

In one or more embodiments the variable size aperture is movable in the image plane orthogonal to the optical axis. This embodiment would enable the light sensor to account for situations where a digital pan and tilt is used when controlling the video camera, i.e., situations where the alignment of the light sensor and the video camera is shifted such that the center of an image captured with the camera no longer coincides with an optical axis of the imaging optics of the video camera. Such digital (or electronic) pan and tilt would disrupt the alignment between the camera system and the image, e.g., the center of the image sensor no longer coincide with the center of the light sensor. Such misalignment could be compensated for by shifting the position of the aperture in said image plane, basically by arranging the aperture in such a way that the center of the aperture is aligned with the center of the image captured with the use of digital pan/tilt/zoom. Notably, for the embodiments where the light sensor element is of a multipixel type, this type of mechanically assisted control mechanism would not have to be applied.

In one or any embodiment the camera system may comprise an IR illuminator, which is also controlled based on input from the separate light sensor. Since the input from the separate light sensor is used as input when controlling the switch between a night mode and a day mode, it may be suitable for controlling an IR illuminator as well. It may of course also be used to control a visual light illuminator, in order to prepare a scene for a switch from night mode to day mode. Such preparations could be to enforce illumination in darker areas of the scene to ensure an even scene illumination. To further enhance this family of embodiments, input from the separate light sensor may also be combined with information from the image sensor of the video camera when providing support to an illuminator.

It is preferred, in one or several embodiments, that the separate light sensor is arranged in the same housing as the video camera system to facilitate calibration and alignment (or the preservation thereof) between the camera system and the light sensor.

In embodiments where a camera head of the camera system has a pan/tilt functionality, it is preferred that the separate light sensor is fixedly arranged in relation to the camera head, such that it readily follows the motion of the camera head.

According to a second aspect of the present invention it relates to a method for controlling a retractable IR-cut filter of a video camera according to the previous or following description. The video camera has a camera lens, an image sensor, and a control unit, and light-sensor for measuring an ambient light level. The method comprises using the light sensor to measure an ambient light level, acquiring a measure for a current field of view of the video camera, adjusting the light sensor or a control thereof to extract an ambient light level corresponding to the current field of view of the video camera, and switching the retractable IR-cut filter into or out of a beam path leading from the camera lens to the image sensor based on the extracted ambient light level corresponding to the current field of view of the video camera. Advantages of various embodiments of the present method will essentially be the same as the advantages stated in relation to the corresponding embodiment for the camera system.

In one or more embodiments the step of adjusting the light sensor or a control thereof comprises changing the size of a readout area on a light sensor chip as a function of the current field of view of the video camera.

In still other embodiments the step of adjusting the light sensor or a control thereof comprises changing the size of an aperture arranged in or near an image plane of the light sensor as a function of the current field of view of the video camera.

In one or several embodiments of the inventive method, the step of adjusting the light sensor or a control thereof comprises combining a light sensor reading from a first and a second light sensor having imaging optics of different focal length, wherein a weight given to the reading from the first and the second light sensor, respectively, varies as a function of the current field of view of the video camera.

Some embodiments of the present invention may also enable mapping of ambient light levels for a number of fields of view in advance. In such embodiments a sequence of different fields of view for the video camera may be used as input for controlling the light sensor or the light sensor readout. The resulting values for the ambient light level may be associated with the corresponding value for the field of view and stored in a memory for future reference. At a later stage, when the video camera is about to change to a new zoom setting, e.g. a new field of view, the ambient light level may be collected from the memory instead of being acquired with a measurement or a calculation. For all functional purposes the control of the light sensor or its readout will have the same function as already described, yet the input is merely a value of a field of view (or zoom level) of the video camera rather than an actual present value. In this way an entire range of possible fields of view for the camera may be evaluated in advance, and stored in a look-up-table or similar. At the time of use the camera controller may then pick a value from said look-up-table corresponding to a particular field of view, instead of performing a simultaneous measurement with the light sensor. Notably, for many video camera installations, the ambient light level may change, slowly with the time of day, or rapidly with someone lighting a lamp, so the validity of such a look-up-table may have some temporal limitations. In situations where the light level is predictable as a function of time, the time may be added and stored together with the corresponding light level value and field of view and used at a later stage.

A typical use case would be when the video camera has a powerful zoom and the operator uses the zoom functionality frequently. In such a scenario it could be beneficial to use a scanning of ambient light levels for different fields of view at regular or irregular intervals, so that there is a reasonably updated value for the ambient light level, a value that can be used with almost zero latency.

The inventive method, in one or more embodiments thereof, may comprise controlling an IR illuminator using the extracted ambient light level corresponding to the current field of view of the video camera as input.

DETAILED DESCRIPTION OF EMBODIMENTS

Figure 1:
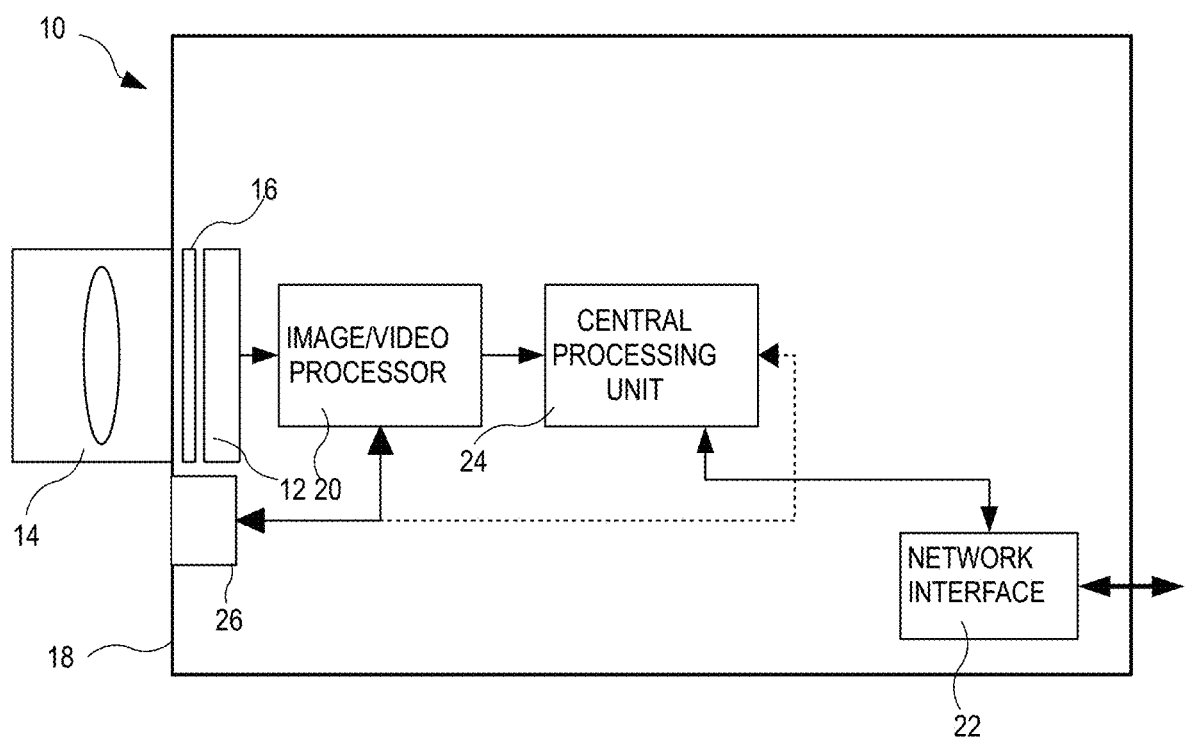
FIG. 1 is a schematic view of a camera setup according to one embodiment of the present invention.

FIG. 1 is a schematic view illustrating a setup in which the present arrangement and method may form a part. What is illustrated is a camera 10, such as a video camera having an image sensor 12 and a camera lens 14. The camera lens 14 of the illustrated example has a standard layout with a lens system, a diaphragm, etc. This is obviously a very simplistic description of a camera lens, but considered sufficient for the purposes of the present application. A retractable IR-filter 16 is positioned such that it may cover the beam path and protect the image sensor from infrared radiation during day-mode imaging and be retracted to allow for infrared radiation to reach the image sensor during night-mode imaging. In theory the IR-filter could be arranged in front of the lens housing (remote from the image sensor) but mechanically controlled IR-filters are commonly arranged in a more protected position, closer to the image sensor, as is exemplified in FIG. 1. In FIG. 1 it is shown to be arranged in the video camera housing 18, yet it could equally well be associated with the camera lens 14 to allow for easier access and removal (by switching camera lens), the latter being very common for larger optics.

FIG. 1 goes on to schematically show some more components of the camera. Data from the image sensor 12 is forwarded to an image/video processor 20 comprising an image processing pipeline where raw image data from the image sensor is transformed to images adequate for showing in isolation or as a part of a video sequence. An encoder (not shown) is arranged for encoding image/video according to an encoding protocol (such as, e.g. H.264 or H.265) before transmitting the image data from the camera via a network interface 22. A central processing unit 24 handles the overall control of the camera and its image processing.

In FIG. 1 all components upstream and including the network interface are shown as being arranged within a camera housing. In other embodiments, however, the components are spatially distributed. As an example, the lens and the image sensor could be arranged in a separate housing (a small camera module), while the intelligence (the processing, etc.) is arranged in another housing, connected to the camera module via a cable or in another way.

Obviously, the above description is simplified as compared to a real-life network camera product, yet since it is contained within the state of the art and not directly related to the present invention this brief summary should be enough.

A separate light sensor 26 is arranged in association with the camera. The light sensor will include imaging optics for collecting ambient light to a sensor element of the light sensor, and some control electronics. Further components may vary with different embodiments, some of which will be described in the following. The light sensor may be incorporated in the camera, which is preferred, or provided as an external auxiliary unit, which may or may not be attached to the camera. The light sensor 26 communicates with a control unit for controlling the imaging system of the camera, such as with the central processing unit 24 or another camera control algorithm, e.g., contained in the image processor 20. The purpose of the light sensor is to detect the ambient light level so that the camera control unit may use it as input for various processes. The light sensor may advantageously have a fixed IR-cut filter so as to only measure the amount of ambient visible light. For the purposes of the present application the main task is to enable for the camera control unit to deduce when it is enough ambient light for the IR-cut filter to be inserted without a detrimental effect on the image quality. At this time any IR-illuminators associated with the camera may usually be switched off, since they no longer serve a purpose. Using a separate light sensor for measuring an ambient light level is considered to be known in the art.

Figure 2:
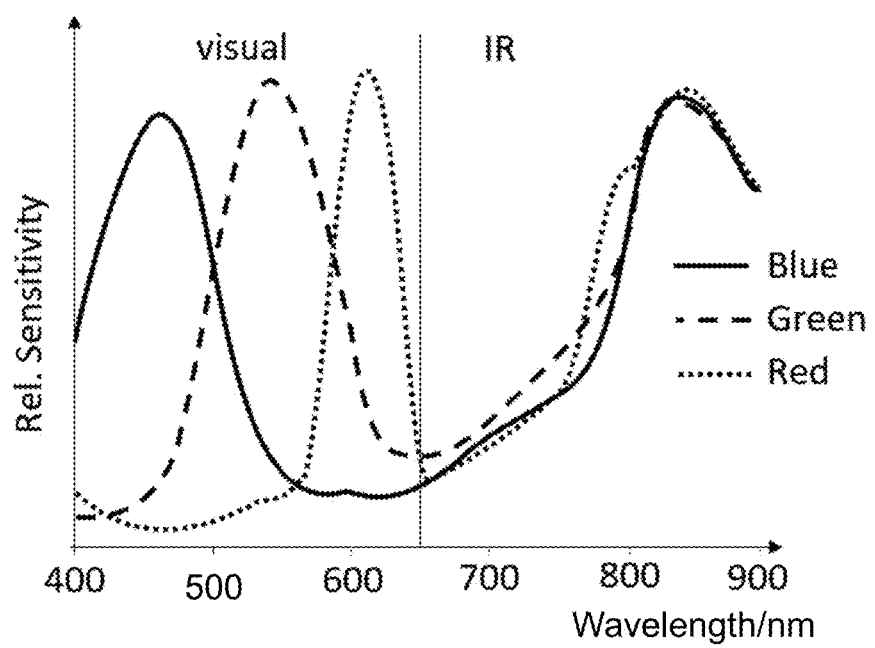
FIG. 2 is a spectral curve schematically illustrating the spectral response in the different color channels of a typical image sensor.

The spectral response in the different color channels of a typical image sensor is illustrated in FIG. 2. The actual response of the image sensor (such as a CMOS image sensor) is not shown, rather what is shown is sensitivity of the color pixels combined with the transmittance curves for the filters arranged in front of pixels of red, green, blue colors, respectively, and notably each filter has an elevated transmittance in the near-IR and IR region, which is what enables for a night mode using a retractable IR-filter. With the IR filter arranged in front of the camera, only the visual portion of the spectrum reaches the image sensor, enabling color imaging (i.e. day-mode), and with the IR-filter retracted (night-mode) also any IR (or NIR) radiation will reach the image sensor resulting in increased intensity. The price paid is that the color information will be skewed, and therefore it is common practice to show images in grayscale when in night-mode.

Figure 3A:
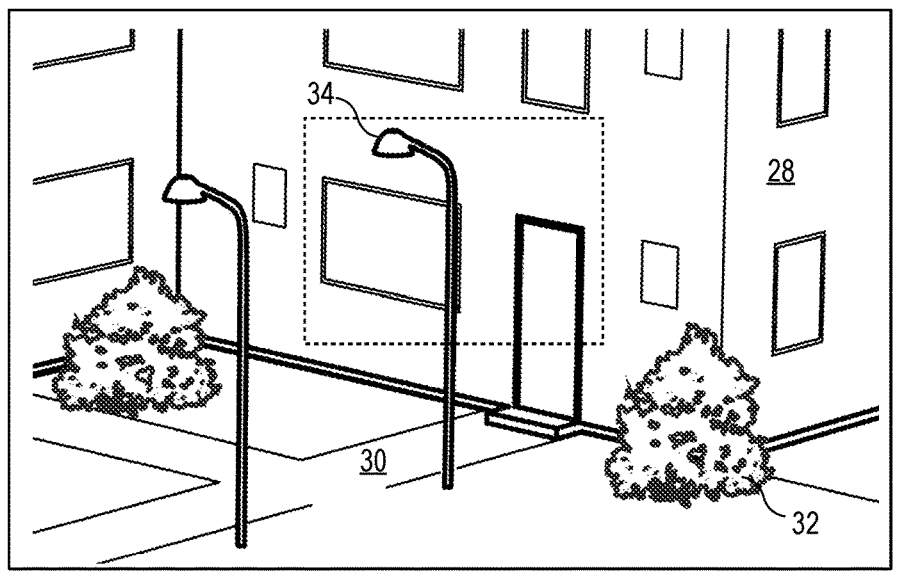
FIGS. 3A and 3B are views of a scene in a zoomed out and a zoomed in view, respectively, embodiments thereof.
Figure 3B:
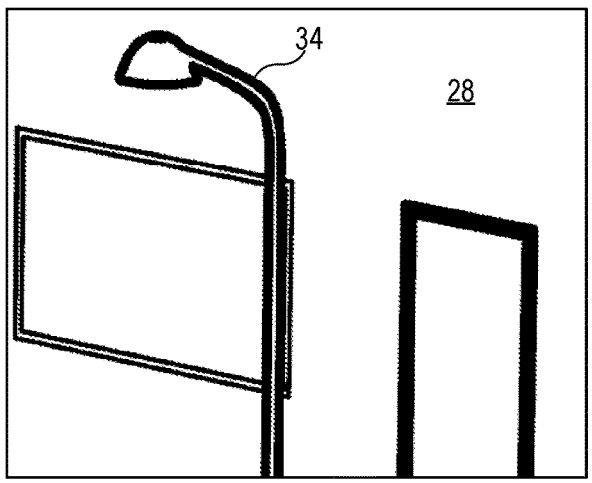

FIGS. 3A and B shows a schematic image of a scene. In the illustrated scenario, the camera is provided with a separate ambient light sensor, letting it know that the ambient light level is too low for day-mode imaging. Consequently, the camera operates in night-mode. In FIG. 3A the camera has a large field of view, imaging parts of a building 28, some pathways 30, bushes 32 and lampposts 34. For the purposes of the present description the lamps of the lampposts are switched on. In FIG. 3B the camera is zoomed in, e.g. in order to better image any individual leaving through the door. The light sensor, measuring the ambient light still informs the camera that the light level is too low for day-mode imaging (after all, the ambient light level is still the same), and the camera will consequently still operate in night-mode, even though the light level in the vicinity of the lamppost may be adequate for a more suitable color imaging (i.e. day-mode). The transfer from the view of FIG. 3A to FIG. 3B may be the result of a driven or manual zoom operation, or merely an effect of using different imaging optics (lenses). In other words, the camera may have a no zoom, a fixed zoom, a manually operated zoom or a driven zoom that may be operated remotely. The problem to be described closer occurs when one and the same ambient light sensor is used irrespective of the zoom level, or rather irrespective of the actual field of view.

In order to address the issue, the present invention provides a dynamic light sensor responsive to a current field of view of the camera with which it is associated. In this way, the ambient light level in the field of view currently imaged by the camera will form the basis for a decision of whether or not an IR-filter should be inserted or not (when transitioning from night-mode to day-mode).

In the following section a number of different embodiments for providing the desired functionality will be described. One prerequisite is the same for all embodiments: A field of view of the camera and a field of view of the light sensor needs to be overlapping, and in some way calibrated. The calibration is not a difficult procedure as such, but this is the reason why it is preferred that the light sensor is fixedly arranged in relation to the camera lens, which could imply that they are arranged on or in the same camera housing, or that the light sensor is arranged in the housing of the lens. If the camera is a type enabled to pan and tilt (manually or motor-assisted) the light sensor should move along with it to maintain calibration. Basically, it is sufficient and suitable that an optical axis of the camera is aligned with (parallel to) an optical axis of the light sensor to enable for maintenance of that a center of the field of view of the camera may be aligned with (calibrated to) a center of the field of view of the light sensor. A fix arrangement makes it possible to perform this calibration or alignment when assembling the camera at a factory rather than in the field, which could be considered overly complicated.

A result of the calibration, alignment or adjustment of the light sensor field of view, may be a look-up table correlating a particular setting of the camera with a particular setting of the light sensor. This means that for a setting of the camera optics a matching value for the light sensor or light sensor readout may be readily deduced and the light sensor may be adjusted to measure or provide an ambient light level value for a field of view corresponding to that used by the camera. This may be performed simultaneously with the camera acquiring images of a scene, or, for instance, by measurements during a calibration phase. As an alternative the outcome could be a mathematical function or algorithm that calculates the correct setting for the light sensor or light sensor readout from the current settings of the camera. In the latter case a look-up table may of course be built from the mathematical function. The use of a mathematical function may be more demanding in terms of processing power, which may be considered as a drawback in situations of limited computing power or if there are temporal constraints. Still, the calculations are not very complex, basically corresponding to a transformation from one coordinate system to another, and the use of one or a set of mathematical functions may be a preferred alternative in instances where the same camera system is prepared for use with several different optics.

If imaging distortions, such as barrel distortion or pincushion distortion, are disregarded it is may be sufficient to align the optical axis of the camera system to the optical axis of the light sensor. In this setup a zoom value of the camera system could be the only input to the light sensor or its control unit, and following the optical axis alignment approximations, the fields of view may be correlated and calculated using data of the optical system of the imaging system and the light sensor, respectively, as input. In other embodiments the calibration and alignment may be more elaborate in order to match a particular area of the image sensor with a particular area of the light sensor element, so as to be able to account for digital pan/tilt/zoom.

There are several alternatives for translating parameters from one sensor to those of another, and in an application of the present invention either one could be used. The user is therefore not limited to the few examples given, and the most suitable method may differ between different embodiments.

Reference is now made to FIGS. 4-7, each showing one or several possibilities for a light sensor suitable for use in embodiments of the invention.

Figure 4:
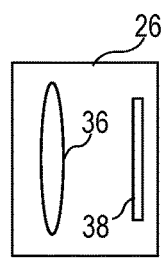
FIGS. 4-7 are examples of light sensors for use in embodiments of the present invention.

The light sensor 26 of FIG. 4 essentially has properties such that it enables imaging of a scene. It comprises imaging optics 36 and a multipixel sensor element 38 enabling a spatial resolution. The imaging optics 36 may be fixed to reduce costs and dimensioned to at least cover the widest possible field of view for the camera with which it is associated. Notably, a single camera unit may be provided with different types of lenses (different focal length), fixed or zoomable, and it is preferable, although not essential, that the light sensor is dimensioned for several or all types. In this context "dimensioned" means that it should, preferably, be able to fulfil its purpose irrespective of which lens is mounted on the camera.

The spatially resolved signal from the light sensor may be forwarded to the control unit 24. Notably, for this embodiment, the signal from the light sensor will correspond to an image of the scene imaged by the camera. The resolution of the spatially resolved signal will depend on the properties of the light sensor, such as the number of pixels, or of the imaging optics. Given that the light sensor has been aligned with the video camera, a current zoom level or field of view of the video camera may be used as input when deciding which area of the spatially resolved signal from the light sensor that should be used when evaluating the ambient light level. In an embodiment where the imaging optics of the light sensor are fixed, this would correspond to cropping of an image. As an example, if the camera is fully zoomed out (maximum field of view), and if the light sensor is perfectly dimensioned to the camera lens, the entire sensor element area could be used. As the camera zooms in (reduces its field of view), gradually smaller areas of the light sensor element will be used, since the optics of this embodiment's light sensor are fixed. The properties of the spatial resolution, e.g. measured as total number of pixels, pixels per inch, etc. may differ. A higher resolution has obvious effects, which may be considered positive, such as few components, no need for moving parts, simple mechanical solutions, software-based control and evaluation etc. Still, a higher number of pixels also results in a larger computational load, which may be considered negative. From a practical viewpoint it would be advisable to use a commonly used image sensor as a light sensor, since this usually has a beneficial effect on the cost. There are numerous alternatives and it is considered well within the skills of an artisan to select one.

For any embodiment disclosed herein a signal from the light sensor may have to be processed in order to be used. The processing may, as for the above embodiment, include the selection of an area to use. For other embodiments it may include scaling of the absolute signal such that it corresponds to the present field of view. A threshold would be an absolute threshold as such, but factors would be applied to compensate for shifts in field of view. In a simplistic example: for a light sensor with fixed optics, or with an aperture that covers portions of a sensor element, a decimation of an active area with a factor of two would half a signal while the actual light level is still the same. Such, and more complex, effects would of course have to be accounted for. Processing may be performed with the aid of look-up tables, or mapping having been performed in advance, if not simple algorithms are sufficient or preferred. Irrespective of the complexity, the present field of view (or zoom level, or another measure of the field of view) of the camera system would be included as a crucial parameter.

Figure 5:
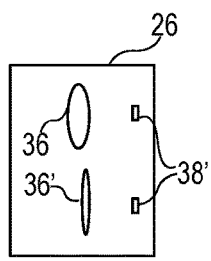
Figure 6:
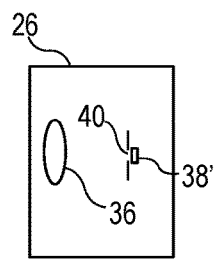
Figure 7:
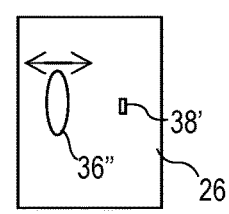

The alternatives of FIGS. 5-7 all relate to light sensor where a sensor element 38' of the light sensor does not have to have any spatial resolution, although use of such multipixel sensor element is not excluded. A standard off-the-shelf light sensor may thus be used, where all light falling in on the sensor element will result in a single signal and the spatial resolution will have to be provided by other components. There are several alternatives available such as photoelectric devices (photo sensors) converting light energy (photons) into electricity (electrons), photodiodes, photoresistors, phototransistors, multipixel CCD/CMOS, or light-to-digital output sensors. In any case, there are plenty options available for the skilled person to choose from. Again, size and cost may be added as factors to consider, once the performance is adequate.

The light sensor of FIG. 5 comprises two different sensor elements 38' and two different imaging optics 36 and 36', respectively (i.e. two different lenses). The imaging optics have different properties to represent a first and a second field of view. It is preferably, but not essential, that one field of view is close to a maximum field of view of the camera lens, and that the other is close to a minimum field of view of the camera (i.e. near a minimum zoom level and a maximum zoom level, respectively). In this way the control unit may use the signal from the first and second sensor element, compare to the zoom level of the camera, and make an interpolation or other weighted combination of the two signals to deduce an ambient light level for the current zoom level (field of view) of the camera. Within the scope of this alternative more than two sensor elements (and associated optics) may be used, such as three, four, five, or more.

In the design of FIG. 6 use is made of an aperture 40 of variable size. The aperture is arranged in an image plane of the light sensor (still comprising imaging optics 36), or as close as possible to an image plane if another component, such as the sensor element 38', is arranged in the image plane. By having the aperture arranged in the image plane it will be possible to vary an effective field of view by altering the size of the aperture, the smaller the aperture the smaller the effective field of view of the signal collected by the image sensor (i.e. will fall onto the sensor element). In this design input regarding the current field of view of the camera will be used as input when controlling the size of the aperture, and since the aperture is located in an image plane alteration of its size will correspond to selecting different fields of view, as mentioned outlined above.

The design of FIG. 7 comprises a zoom lens 36", and apart from that the sensor element 38' may be very simple, the light sensor as such has an optics system similar to a camera with variable zoom. A current field of view of the camera may be used as input for controlling the zoom lens, yet the zoom lens of the light sensor may also be controlled autonomously.

Figure 8A:
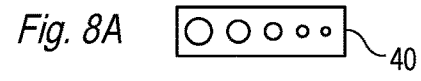
FIGS. 8A-D are examples of variable apertures that may be used in one or more embodiments of the present invention.
Figure 8B:
Figure 8C:
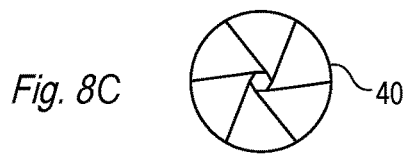
Figure 8D:
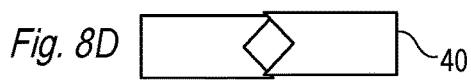

FIGS. 8A-D illustrate different means for achieving a variable aperture 40, all considered to be known as such. FIG. 8A is a plate with apertures of different sizes in it. By translating the plate in the image plane an active aperture may be selected. FIG. 8B is essentially the same solution but the switch between active apertures is performed by rotation instead of translation. FIGS. 8C and 8D illustrate variable apertures of different types. The one of FIG. 8C is an iris aperture of standard design recognizable for most people. The one of FIG. 8D is also well-known for the skilled person at the aperture size is varied by moving the two blades towards or away from each other (in the plane of the drawing, left and right respectively). As has been mentioned previously it is preferred, or even essential, that the aperture is arranged in an image plane, so that the ambient light level in different parts of the scene (different fields of view) may be selected. The sensor element may be arranged directly behind the aperture, or in a focal point to ensure maximum collection of ambient light from the selected part of the scene.

In the most straightforward embodiment, the measurement of light level is performed in close temporal relationship with a possible filter switch. It is of course always desirable to have values for the light level being relevant for a current lighting situation. However, there are further embodiments where there may be reasons with small deviations from this approach. One example would when the associated video camera has a zoom functionality that is used actively during normal operation. In such an embodiment it could be beneficial to have some information regarding the ambient light level for other zoom levels in advance, in order to enable agile adjustments of the IR-cut filter. Typically, an operator would instruct the camera to go from a first zoom level to a second zoom level, and if the mapping of light levels have been performed in advance a possible switch could be performed in advance, during a transition from a first to a second zoom. The properties of the present setup, as described in any embodiment thereof, is very well suited for this type of mapping, in particular since the light sensor may be controlled separately from the camera, they do not share optics, etc. The general idea in this family of embodiments is to record light levels for a number of zoom levels, and to store these in a memory. This mapping may be performed regularly, or based on a user request, as part of an initiation phase, or automatically as a result of that a user starts to change the zoom level. When the mapping has been performed the control unit may acquire a light level from the memory instead of from an associated measurement. The approach may have an advantage in that the time required for an assessment may be shorter (check a value in a look-up table as compared to performing a measurement and a calculation). As mentioned before, the time between an actual measurement and use of the measured ambient light may be an important parameter. As an example, in an outdoor installation the ambient light could be expected to vary more than in an indoor installation. Following that assumption, outdoor installations would therefore require more frequent mapping of ambient light levels for the data to be up to date, or mapping at various time of day, etc. Notably, the system may measure the ambient light level more or less continuously, and a change in an overall light level could also be used as input to trigger a full mapping of ambient light level for various fields of view.

The light sensor will not allow passage of IR-radiation, since the main purpose is to evaluate the ambient light conditions and the suitability to switch to day-mode.

The control unit of the camera and of the light sensor is described as a single entity 24, and the skilled person should realize that the tasks as described being performed by this control unit could be performed by one or more units or processes, e.g. controlling the light sensor, controlling the light sensor readout, evaluating a signal from the light sensor, control of the camera, correlating camera parameters to light-sensor reading, etc. Instead of making a calculation or assessment in the control unit it could be performed, fully or partly, by an algorithm in the image processing pipeline, on an ASIC or an algorithm executed elsewhere within or externally of the camera. Furthermore, the algorithm (or the control unit) will communicate with a memory of volatile or non-volatile characteristics. The result of such considerations may differ between different systems and possibly also between different skilled persons set to solve the problem. In any case, the specific execution does not need to be detailed in the present application.

Figure 9:
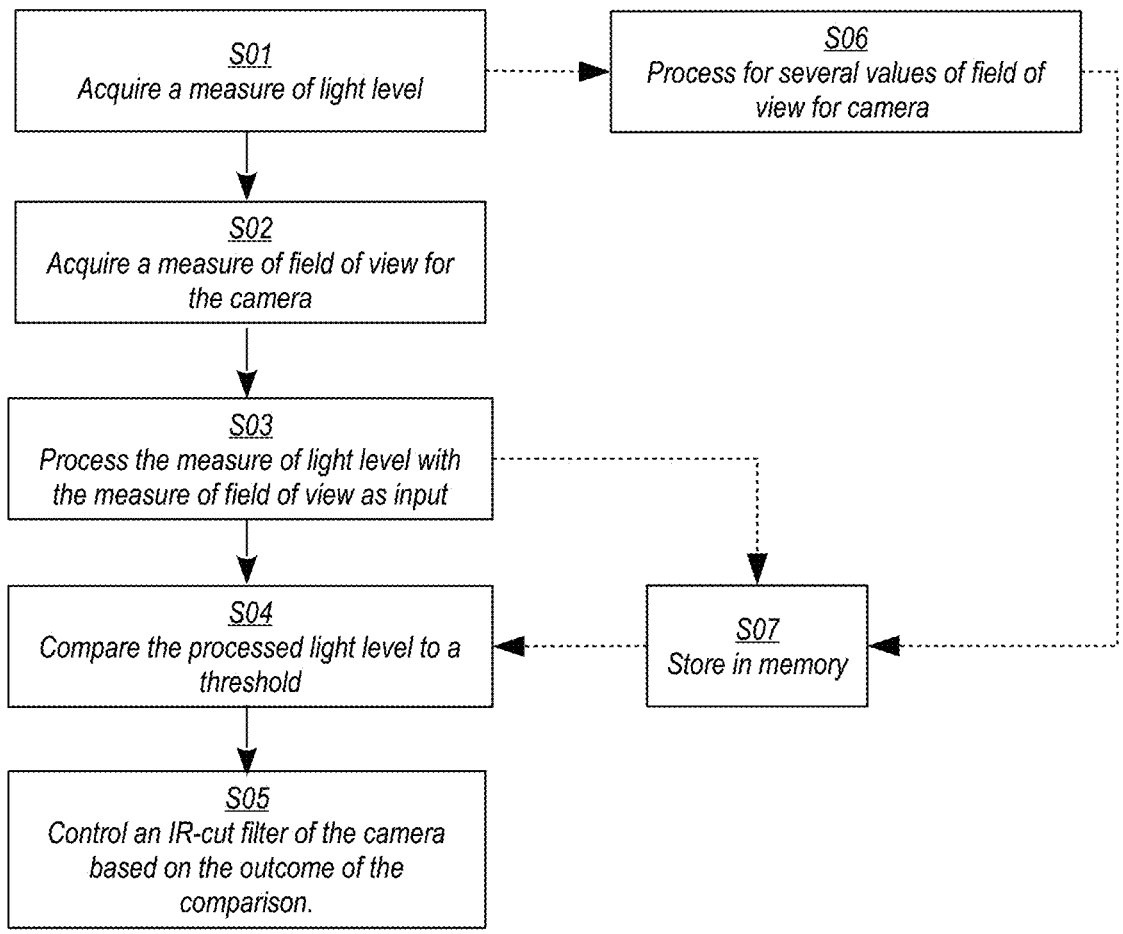
FIG. 9 is a flow chart illustrating various embodiments of the present invention.

FIG. 9 is a flowchart illustrating various embodiments of the present invention. It should be noted that although all embodiments solve the same inventive problem, they may not be readily disclosed in one and the same flowchart. The reason is that for the different embodiments the steps included may be performed in different order. Furthermore, while the embodiments of FIGS. 4 and 5 may enable post processing using a value for the field of view of the video camera for finding the light level for that particular field of view (since a light level measure for all zoom levels may be acquired in a single measurement step) the embodiments of FIGS. 6 and 7 require setting control parameters of the light sensor based on a value for the field of view (or zoom level) in advance. In patent claim language this is of no consequence since the order of a method is not limited to that of the claim, yet when referring to a flowchart the difference may be slightly confusing. For the embodiment of FIGS. 4 and 5 the flowchart of FIG. 9 makes sense, while for the embodiments of FIGS. 6 and 7, steps 01 and 02 would have a shifted order. However, a brief description of the disclosed embodiments of FIG. 9 would be: In step S01 a measure of light level is acquired, using the light sensor as previously described. In step S02 a measure of the field of view of the camera is acquired. This measure is available in the camera control, e.g. directly derivable from optics data (the focal length of the lens, the current zoom level, etc.). The measure of the light level is processed, essentially scaled, to match the field of view of the video camera, in step S03. In some embodiments this is performed post readout of the signal (e.g. FIG. 4 and FIG. 5), while in others this is performed by altering drive parameters of the light sensor, as has been previously described (e.g. FIG. 6 and FIG. 7). In step S04 the processed light level is compared to a threshold, and in the final step, S05, control of an IR-cut filter is effected based on the outcome of the comparison.

The dotted lines represent some further embodiments. It is readily understood that the field of view, or a zoom level, may be represented by a set of parameters. For the functionality of the present invention it is imperative that this set of parameters is representative of the current field of view of the camera, at least when video or image data is recorded.

Still, the invention also enables embodiments where data is calculated in advance, by inputting a sequence of fields of view (in the form of a number of sets of parameters) and evaluating the resulting measures of light level (S01 and S06). Thereby it is possible to readily generate look-up-tables or mappings of light levels for a present scene and to store in a memory S07. The look-up-tables or mappings may then be used when controlling the IR-cut filter. Variations of this embodiment has been described on the previous pages.

Furthermore, the dotted lines and associated boxes represent embodiments where mapping of light levels is performed in advance. The video camera may in any embodiment be a monitoring camera, for example a monitoring camera adapted for video surveillance. In most cases this would be a digital video camera, although application of the present invention could also be realized in the context of analogue video cameras.

In one or any embodiment the camera system may include IR-illuminators, and control of the IR-filter may also include control of the illuminators. Such that, for example, the illuminators are switched on as the IR-filter is removed (to enter night mode) and are switched off as the IR-filter is inserted (to enter day mode). The light sensor of any embodiment may be used for this purpose. Additionally, data from the light sensor may be combined with data from the image sensor of the camera.

The invention claimed is:

1. A video camera system comprising:
an imaging system having a camera lens and an image sensor, and a retractable IR-cut filter, and
wherein the video camera system has a day-mode in which the IR-cut filter is arranged in front of the image sensor, and a night-mode in which the IR-cut filter is retracted from its position in front of the image sensor,
wherein the video camera has a field of view defined by properties of its imaging system,
the camera system further comprising a separate light sensor for measuring an ambient light level forming a basis for a decision regarding when to actuate a transfer from night-mode to day-mode, or vice versa,
characterized in that the separate light sensor has imaging optics and is configured to provide a variable field of view, which is aligned with a field of view of the video camera system, and
in that a current field of view of the video camera system is used when selecting an active field of view of the separate light sensor.

2. The video camera system of claim 1, wherein the separate light sensor is provided with a multi-pixel sensor element.

3. The video camera system of claim 1, wherein the separate light sensor comprises a sensor element and a variable size aperture in an image plane of the light sensor providing a variable field of view.

4. The video camera system of claim 3, wherein the variable size aperture is movable in image plane orthogonal to the optical axis.

5. The video camera system of claim 1, wherein the separate light sensor comprises at least two imaging lenses of different focal length, and one sensor element for each imaging lens, enabling provision of the variable field of view by means of a weighted combination of a signal from each sensor element.

6. The video camera system of claim 1, wherein the imaging lens is a zoom lens, providing light from a variable field of view to fall onto the sensor element.

7. The video camera system of claim 1, further comprising an IR illuminator, which is also controlled based on input from the separate light sensor.

8. The video camera of claim 1, wherein the separate light sensor is arranged in the same housing as the video camera system.

9. The video camera system of claim 1, wherein a camera head of the camera system has a pan/tilt functionality, and wherein the separate light sensor is fixedly arranged in relation to the camera head.

10. A method for controlling a retractable IR-cut filter of a video camera, said video camera comprising a camera lens, an image sensor, and a control unit, and a light-sensor, the method comprising
using the light sensor to measure an ambient light level,
acquiring a measure for a current field of view of the video camera,
adjusting the light sensor or a control thereof to extract an ambient light level corresponding to the current field of view of the video camera,
switching the retractable IR-cut filter into or out of a beam path leading from the camera lens to the image sensor based on the extracted ambient light level corresponding to the current field of view of the video camera.

11. The method of claim 10, wherein the step of adjusting the light sensor or a control thereof comprises changing the size of a readout area on a light sensor element as a function of the current field of view of the video camera.

12. The method of claim 10, wherein the step of adjusting the light sensor or a control thereof comprises changing the size of an aperture arranged in or near an image plane of the light sensor as a function of the current field of view of the video camera.

13. The method of claim 10, wherein the step of adjusting the light sensor or a control thereof comprises combining a light sensor reading from a first and a second light sensor having imaging optics of different focal length, wherein a weight given to the reading from the first and the second light sensor, respectively, varies as a function of the current field of view of the video camera.

14. The method of claim 10, wherein a sequence of different fields of view for the video camera are used as input to the light sensor or to a control unit associated with the light sensor, and wherein extracted ambient light level values are associated with the corresponding value for the field of view and stored in a memory for future reference.

15. The method of claim 10, further comprising controlling an IR illuminator using the extracted ambient light level corresponding to the current field of view of the video camera as input.

* * * * *